US008456670B2

(12) United States Patent
Kusakabe

(10) Patent No.: US 8,456,670 B2
(45) Date of Patent: Jun. 4, 2013

(54) PRINTING DEVICE AND PRINTING SYSTEM FOR CONTROLLING AUTHENTICATION PRINT JOBS

(75) Inventor: Yoshiaki Kusakabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 822 days.

(21) Appl. No.: 12/379,209

(22) Filed: Feb. 17, 2009

(65) Prior Publication Data

US 2009/0213423 A1 Aug. 27, 2009

(30) Foreign Application Priority Data

Feb. 22, 2008 (JP) .................................. 2008-041720

(51) Int. Cl.
*G06F 3/12* (2006.01)
*G06K 9/00* (2006.01)
*H04L 9/32* (2006.01)

(52) U.S. Cl.
USPC ....... 358/1.15; 358/1.13; 358/1.14; 358/1.16; 358/1.9; 358/401; 358/464; 358/474; 358/468; 382/100; 382/115; 382/119; 713/150; 713/155; 713/161; 713/164; 713/168; 713/169; 713/170; 235/382; 235/494

(58) Field of Classification Search
None
See application file for complete search history.

(56) References Cited

U.S. PATENT DOCUMENTS

| | | | | |
|---|---|---|---|---|
| 7,190,477 | B2 * | 3/2007 | Ferlitsch | 358/1.15 |
| 7,199,889 | B2 * | 4/2007 | Miyano | 358/1.14 |
| 7,313,699 | B2 * | 12/2007 | Koga | 713/170 |
| 7,383,448 | B2 * | 6/2008 | Kohara | 713/300 |
| 7,406,611 | B2 * | 7/2008 | Takahashi et al. | 713/300 |
| 7,443,527 | B1 * | 10/2008 | Shigeeda | 358/1.15 |
| 7,831,697 | B2 * | 11/2010 | Fukushima | 709/223 |
| 2005/0188222 | A1 * | 8/2005 | Motsinger et al. | 713/201 |
| 2006/0184543 | A1 * | 8/2006 | Fukuta | 707/10 |
| 2007/0115494 | A1 * | 5/2007 | Nakayama | 358/1.14 |

FOREIGN PATENT DOCUMENTS

| JP | 2005-182477 A | 7/2005 |
|---|---|---|
| JP | A-2006-231673 | 9/2006 |
| JP | 2007-280045 A | 10/2007 |

* cited by examiner

*Primary Examiner* — Steven Kau
(74) *Attorney, Agent, or Firm* — Posz Law Group, PLC

(57) ABSTRACT

A printing device includes a processor, an attribute managing part configured to be activated by the processor to communicate with a host device and to control an authentication printing job received from the host device, a memory configured to store authentication printing job data and user information extracted from the authentication printing job data, and a deleting part configured to delete the authentication printing job data and the user information stored in the memory based on predetermined results of communication between the attribute managing part and the host device. As a result, the user is not required to consider whether the time for which the authentication printing data is stored should be extended.

20 Claims, 17 Drawing Sheets

JOB C1 DELETED

Fig. 12

| FILE NAME | TRANSMISSION SOURCE TERMINAL | PASSWORD | IP ADDRESS |
|---|---|---|---|
| JOB C1 | PC100-3 | yxxxyy | 10.49.30.55 |
| JOB D1 | PC100-4 | xxxxy | 10.49.30.57 |
| JOB A1 | PC100-1 | xxxyxxx | 10.49.30.73 |
| JOB D2 | PC100-4 | yxyyyyx | 10.49.30.57 |

| FILE NAME | LOGIN USER NAME | TRANSMISSION SOURCE TERMINAL | PASSWORD |
|---|---|---|---|
| JOB E1 | E | PC 1100-1 | yxxxyy |
| JOB H1 | H | PC 1100-2 | xxxxy |

| FILE NAME | LOGIN USER NAME | TRANS. SOURCE TERMINAL | PASSWORD |
|---|---|---|---|
| JOB H1 | H | PC 1100-2 | yxxxyy |
| JOB A1 | A | PC 1100-1 | xxxyxxx |
| JOB H2 | H | PC 1100-2 | yxyyyx |

Fig. 20

| LOGIN USER NAME | TRANS. SOURCE TERMINAL |
|---|---|
| E | PC 1100-1 |
| H | PC 1100-2 |

Fig. 21

| LOGIN USER NAME | TRANS. SOURCE TERMINAL |
|---|---|
| A | PC 1100-1 |
| H | PC 1100-2 |

Fig. 22

PRINTING DEVICE AND PRINTING SYSTEM FOR CONTROLLING AUTHENTICATION PRINT JOBS

CROSS REFERENCE TO RELATED APPLICATION

The present application is related to, claims priority from and incorporates by reference Japanese Patent Application No. 2008-041720, filed on Mar. 12, 2008.

TECHNICAL FIELD

The present invention relates to printing systems and devices, and specifically to a printing device and system for printing by a print job received from a host device.

BACKGROUND

A well-known printing device collates a password input by a user and authentication information attached to printing data (hereafter, authentication printing data), and executes print processing when the authentication print data, in which authentication information such as a password is attached, is transmitted from numerous host devices on a communication network. This printing device deletes the authentication printing data if the user does not input a password within a predetermined period of time.

In order to solve the above-described problems, for example, Japanese Laid-Open Application Publication No. 2006-231673 discloses a printing device that inquires the host device of a transmission source whether or not the output period of authentication printing data needs to be extended when the user does not provide instructions for the authentication printing data until the predetermined period of time has elapsed from the time the authentication printing data was received. When the host device does not reply to this inquiry, the printing device deletes the authentication printing data.

However, it is always necessary for the user to reply to the inquiry whether or not the output period of the authentication printing data by the printing device needs to be extended. In other words, if the user does not reply to this inquiry, the authentication printing data is deleted after the predetermined period of time has elapsed.

SUMMARY

In light of these circumstances, a printing device and a printing system of the present invention can securely store authentication printing data transmitted to the printing device without requiring the user to consider extending the output period.

In order to solve the above-stated problems, this invention provides a printing device for receiving an authentication printing data transmitted by a host device through a communication network and printing an image based on the authentication printing data on a recording medium. The device includes a receiving part configured to receive the authentication printing data and user information from the host device; a device specifying part configured to specify a position on the communication network of the host device by using the user information that was received at the receiving part; a condition monitoring part configured to monitor a device condition of the host device specified by the device specifying part; an authentication information inputting part configured to accept input authentication information by the user; a judging part configured to judge whether or not the authentication printing data and the user information need to be deleted based on a monitoring result of the condition monitoring part, and to judge whether or not to approve printing of the image based on the authentication printing data by collating the authentication information that was received by the authentication information inputting part and the user information attached to the authentication printing data; a deleting part configured to delete the authentication printing data and the user information based on the judging part; and a printing part configured to print the image on the memory medium based on the authentication printing data and based on judgment of the judging part.

The printing device of the present invention includes a device specifying part which specifies a position on the network communication of the host device. Therefore it is realized easily to identify the host device that sent the authentication printing data to the printing device and that exists on the communication network.

Additionally, the printing device can manage/control the condition of the host device by monitoring the device condition of the host device that was specified by the device specifying part. Therefore, the user does not need to consider an extension request for storing the authentication printing data as the printing device executes the processing to delete the authentication printing data and the user information received, for example, only when discrepancies/deficits occur such as when the power of the host device is turned off.

Moreover, the printing device might include an authentication information inputting part that accepts input of authentication information by the user. Therefore, the authentication information input by the user and the user information attached to/along with the authentication printing data are collated, and when they matched, the printing device can execute printing processing of the authentication printing data.

In addition, another feature of the invention includes a printing system that includes the above-described printing device, as well as an image forming device that includes a document creating part configured to accept creation of documents by the user and a controlling part configured to convert the document created at the document creating part into the authentication printing data and to transmit the authentication printing data and the user information over the communication network.

Accordingly, the document created by the user can be transmitted as the authentication printing data to the aforementioned printing device. Moreover, because the information processing device can transmit the user information to the printing device, user information of the information processing device also can be provided to the printing device.

According to the above printing device and printing system, it is possible to securely store the authentication printing data in the printing device without requiring the user to consider an extension regarding storing the authentication printing data that was transmitted to the printing device.

BRIEF DESCRIPTION OF DRAWINGS

FIG. 12 is a table of exemplary authentication printing job controlling information.

FIG. 20 is a table of exemplary authentication printing job managing information.

FIG. 21 is an exemplary user list.

FIG. 22 is an exemplary user list.

DETAILED DESCRIPTION

Hereafter, a printing device and a printing system are explained with reference to the drawings. In the explanation of the present embodiment, for example, a computer (hereafter, a PC) that can create user documents as a host device, and a printer as a printing device that receives the authentication printing data transmitted from the PC and prints an image based on the authentication printing data stored on a memory medium, are explained.

[First Embodiment]

Figure 1:
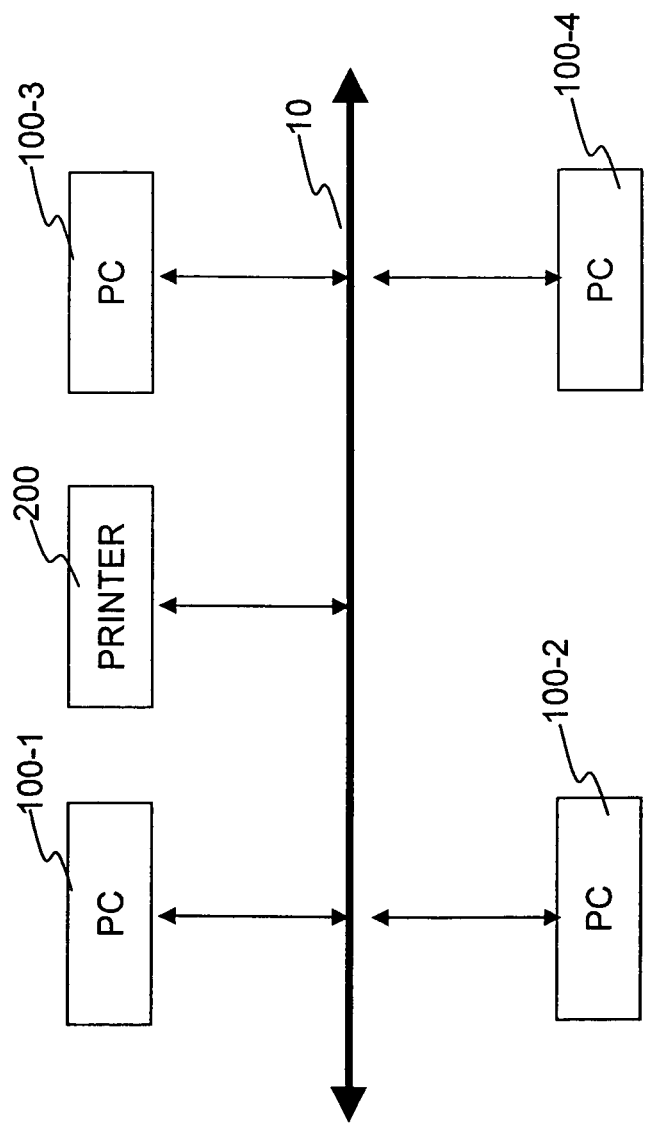
FIG. 1 is a schematic block diagram of a network structure.

In the first embodiment, as shown in FIG. 1, a plurality of PCs 100-1, 100-2, 100-3, 100-4 and a printer 200 are connected in a network 10 through an interface such as a local area network (LAN). Further, PCs 100-1, 100-2, 100-3 and 100-4 of the first embodiment are considered to be essentially identical.

Figure 2:
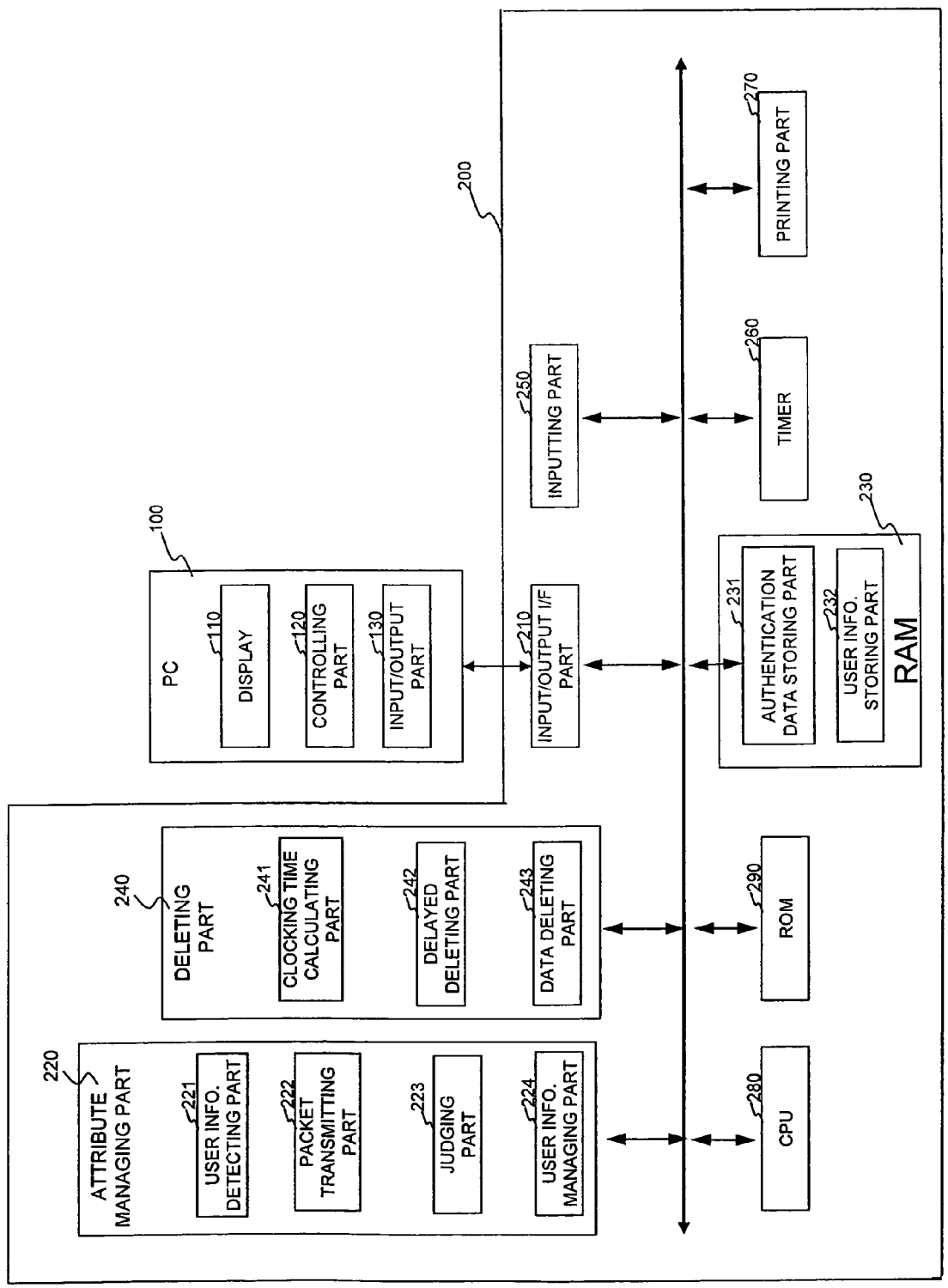
FIG. 2 is a schematic block diagram of the structure of FIG. 1 showing a personal computer (PC) and a printer in detail.

FIG. 2 is a schematic block diagram showing the main components of a PC 100, which is representative of the PCs 100-1-100-4, and the printer 200 of the first embodiment. First, the PC 100, then the printer 200, will be explained.

The PC 100 includes a display 110 that displays documents created by the user and various of information, a controlling part 120 that includes an application program and a printer driver, and the input/output part 130 that performs data transmission of the authentication printing data or the like.

The display 110 displays documents created by the user, printing setting contents, user information notifications input though the input/output part 130 from the printer 200 or the like. The display 110 is not limited in type, but monitors such as a cathode ray tube (CRT) or liquid crystal display (LCD) can be used.

The controlling part 120 includes the application program as the document creating part and the printer driver. The application program operates on an operation program that is not shown in the figure, and can create text documents, drawing documents or the like based on the input instructions by the user. The application program is stored in the memory, which is not shown in the figures. The functions of the program can be realized when a central processing unit (CPU) that is not shown in the figures reads the program from the memory based on instructions by the user, and runs the program. Moreover, the printer driver, similar to the application program, operates based on the operating program and for example converts the document created by the application program into printing data formatted in readable description language for the printer 200 according to the input instructions by the user. Moreover, the printer driver adds user information such as a password to the converted printing data, and creates an authentication printing job in which comparison to the password is necessary in order to execute printing. Moreover, the printer driver receives a communication signal from the printer 200, and returns the response with respect to the received communication signal to the printer 200.

The input/output part 130 transmits the authentication printing job created by the printer driver of the controlling part 120 to the printer 200, and performs transmission and reception of the communication signal.

Next, the printer 200 is explained. The printer 200 comprises an output/input I/F part 210, an attribute managing part 220 that controls the authentication printing job, a random access memory (RAM) 230, a deleting part 240 that deletes the authentication printing job, an inputting part 250 as the authentication information inputting part that receives the input of the authentication information by the user, a timer 260 that clocks time, a printing part 270 that prints images based on the authentication printing job on the recording medium, a CPU 280 that executes operation processing and a read only memory (ROM) 290 that stores a control program.

The output/input I/F part 210 is an interface which transmits and receives a communication signal between both sides of the printer 200 and PC 100 by network communication.

The attribute managing part 220 internally includes a user information detecting part 221 as a device specifying part, a packet transmitting part 222, a judging part 223 and a user information managing part 224. The attribute managing part 220 controls the authentication printing job received though the output/input I/F part 210 from the PC 100 and each address of the PC 100 (a position on the network, hereafter IP address). Moreover, the attribute managing part 220 is activated by executing the control program of the CPU 280 stored in the ROM 290 in advance. Hereafter, the user information detecting part 221, the packet transmitting part 222, the judging part 223 and the user information managing part 224 are explained.

The user information detecting part 221 extracts a terminal name, password and IP address (hereafter, user information) that are allocated to the authentication printing job transmitted from the PC 100. This user information is arranged/processed as a printing waiting job in the order of the oldest to the most recent receipt times, and stored in the user information storing part 232 in the RAM 230.

The packet transmitting part 222 transmits a packet in order to confirm whether or not the power of the PC 100, that is, the destination of the IP address extracted from the authentication printing job by the user information detecting part 221, is turned on or off. A ping command can be used for the example of the packet. The ping command is a communication test program of a simple packet that uses an echo command that is a sub command of internet control message protocol (ICMP). In short, the packet transmitting part 222 performs the transmission of a ping command in order to confirm whether or not the power of the PC 100 that exists on the network is turned on or off.

The judging part 223 compares the password extracted from the authentication printing job by the user information detecting part 221 and the password input to execute printing by the user through the inputting part 250, and outputs the collated result. Moreover, the judging part 223 executes judging processing with respect to the processing executed at each part, and informs the user information managing part 224 of the results.

The user information managing part 224 manages the user information that is stored in the user information storing part 232. Moreover, the user information managing part 224 performs control of the storing location of the authentication printing job stored in the authentication data storing part 231.

The RAM 230 is random access memory that forms an operation area that is necessary when the CPU 280 executes the controlling program that is stored in the ROM 290. For the CPU 280 to execute the control program stored in the ROM 290, the authentication data storing part 231 and the user information storing part 232 are formed in addition to the normal operation area in RAM 230. In the authentication data storing part 231 formed by the RAM 230, the authentication printing job (authentication printing data) that is received through the input/output I/F part from the PC 100 is stored. Moreover, the user information storing part 232 is a memory area in which the user information extracted from the authentication printing job by the user information detecting part 221 is stored. In this user information, the IP address is controlled by the user information managing part 224. Moreover, this user information is stored in the user information storing part 232 as the authentication control information that shows a print queue of the authentication printing job described below.

The deleting part 240 includes a clocking time calculating part 241 which obtains time information output from the timer 260 and which defines the time when the time information was obtained as a clocking time, a delayed deleting part 242 that sends deleting instructions of the authentication printing job after the predetermined period of time has elapsed, and a data deleting part 243 that deletes the user information when the delayed deleting part 242 deletes the authentication printing job. Moreover, the deleting part 240 is activated when the CPU 280 executes the control program stored in the ROM 290. The clocking time calculating part 241 of the deleting part 240 calculates the elapsed time from when the packet transmitting part 222 transmits a ping command to the PC 100 until the PC 100 returns a response to this ping command to the printer 200. Moreover, this elapsed time is calculated based on the time information output by the timer 260. Further, when this elapsed time exceeds the predetermined period of time, the clocking time calculating part 241 outputs the fact that the timer was exceeded (hereinafter, an exceeded timer) to the delayed deleting part 242. The exceeded timer is input in the delayed deleting part 242 when the packet transmitting part 222 transmits the ping command to the PC 100, and the PC 100 does not return a response to the packet transmitting part 222 in the predetermined period of time. When the exceeded timer is input in the delayed deleting part 242, the CPU 280 executes the control program stored in the ROM 290 in advance so that the authentication printing job that was transmitted from the PC 100 is deleted the PC 100 from the print queue. The data deleting part 243 executes a deleting processing of the user information of these authentication printing jobs stored in the user information storing part 232 when the delayed deleting part 243 deletes the authentication printing job.

The inputting part 250 accepts the input of a password by a user who desires to print the authentication printing job. The inputting part 250 may be for example an inputting device such as a touch panel, and an operation panel formed by a display device such as an LCD that displays an operation condition.

The timer 260 outputs the time information without being suspended while the printer 200 is activated. The time information that was output at the timer 260 is calculated at the clocking time calculating part 241.

The printing part 270, for example, is a printing engine for an electrophotographic method to print an image based on the authentication printing job (authentication printing data) received through the input/output I/F part 210 from the PC 100 based on control by the CPU 280.

The CPU 280 is a microprocessor that controls the printer by executing the control program stored in the ROM 290. Particularly, in the present embodiment, the CPU 280 activates the attribute managing part 220 and the deleting part 240 by executing the control program stored in the ROM 290 in addition to ordinarily controlling processing of the printer 200.

The ROM 290 is a non-volatile memory medium which stores the control program executed by the CPU 280. Especially, in the present embodiment, the control program by which the CPU 280 activates the attribute managing part 220 and the deleting part 240 are stored in the ROM 290. For the ROM 290, an ultra-violet erasable programmable read only memory (UV-EPROM), electronically erasable and programmable read only memory (EEPROM) or the like can be used as the non-volatile memory.

Next, the operation of the printer 200 and the PC 100 is explained. First of all, the transmission sequence of the authentication printing jobs executed between the printer 200 and the PC 100 is explained using FIG. 3. Next, the sequence of the communication signals transmitted between the printer 200 and the PC 100 is explained using FIG. 4. Moreover, the printer 200 is arranged on the left side of the drawing, and PC 100 is arranged on the right side. The top to bottom of the drawing shows elapsed time.

Figure 3:
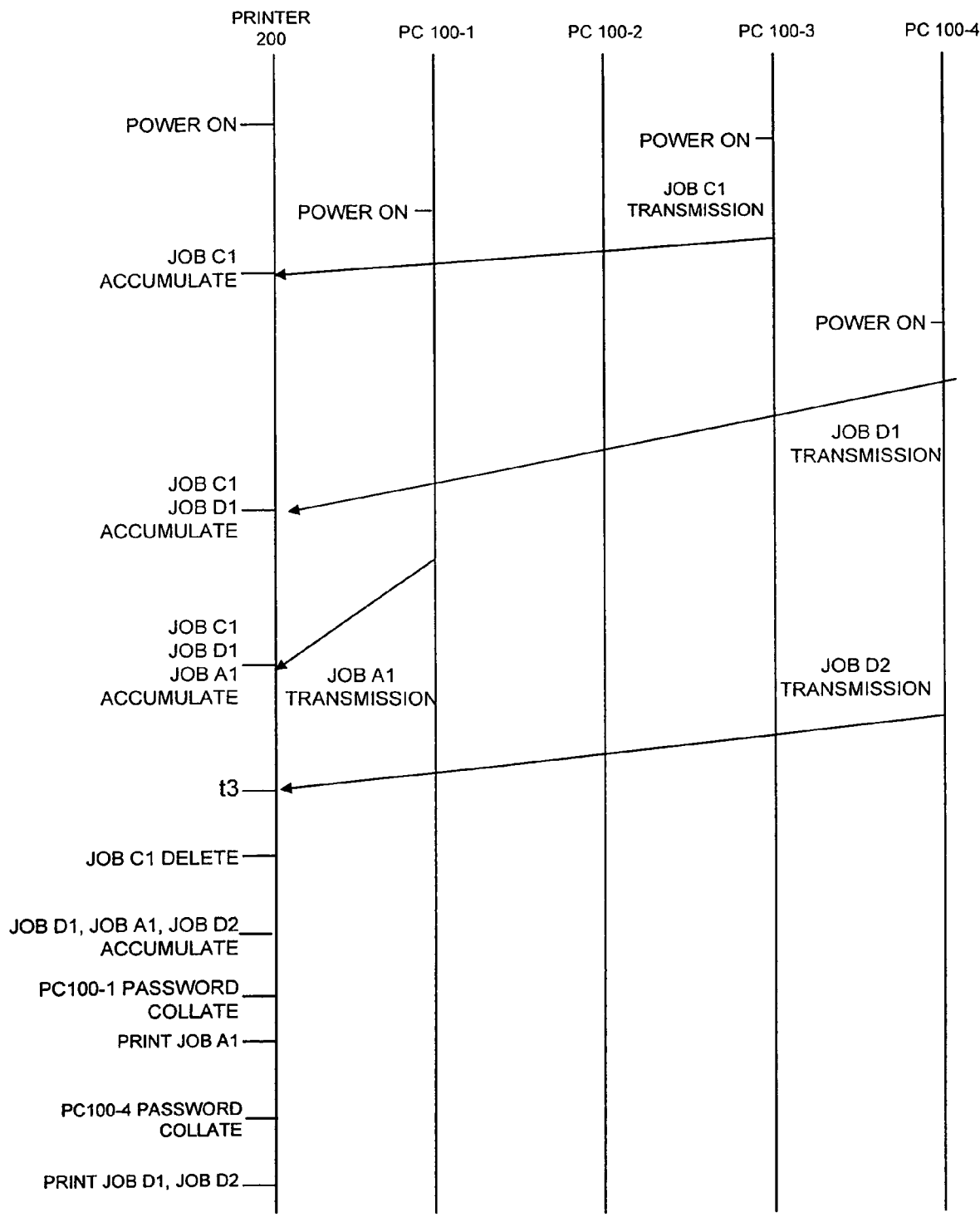
FIG. 3 is a sequence diagram explaining an authentication printing job.

Four PCs (PC 100-1, PC 100-2, PC 100-3 and PC 100-4) and the printer 200 are connected through the network. As shown in FIG. 3, first of all, the power of the PC 100-3 is turned on, and the authentication printing job C1 is transmitted. At approximately the same time, the power of the PC 100-1 is turned on. Next, the power of the PC 100-4 is turned on, and the authentication printing job D1 is transmitted. After this, the authentication printing job A1 is transmitted from the PC 100-1. At last, the authentication job D2 is transmitted from the PC 100-4. The transmitted authentication printing jobs sent by each of the PCs 100-1-100-4 are stored in the RAM 230 of the printer 200. Here, t3 in FIG. 3 is defined as the time which is after the authentication jobs transmitted from the PC 100-1, the PC 100-3 and the PC 100-4 were received by the printer 200. At this time, the authentication printing jobs, for example, are stored in the user information storing part 232 as the authentication printing job control information shown in FIG. 12. The authentication printing job control information of FIG. 12 is the screen of the authentication printing job control information at the aforementioned time t3, and shows the print queue of the authentication printing jobs. This authentication printing job control information is stored in the user information storing part 232. The authentication printing job control information includes "file name," "transmission source terminal," "password" and "IP address" as the content to specify each authentication printing job, and is stored in the user information storing part 232 in order of oldest to newest based on time of receipt.

Figure 4:
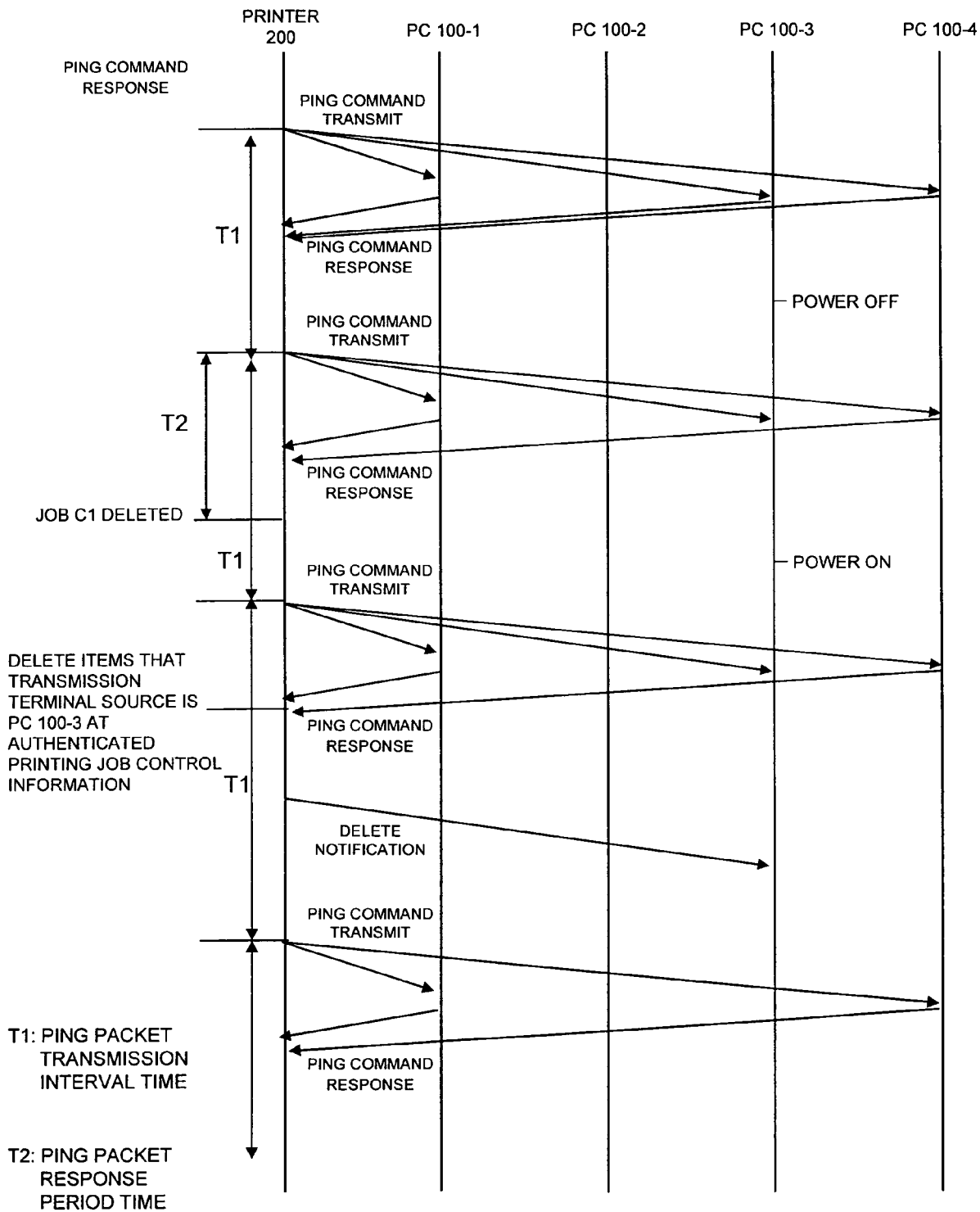
FIG. 4 is a sequence diagram explaining a user information notification.

Transmission and reception of signals as shown in FIG. 4 is performed between the four PCs 100-1-100-4 and the printer 200. Here, the times (T1 and T2) shown in FIG. 4 are the times calculated at the clocking time calculating part 241. T1 is a cycle, or ping packet transmission interval time, for the printer 200 to transmit the ping commands as the packet transmission means to a predetermined PC 100. In detail, it is the time from transmission of the first ping command to the transmission of the next ping command. Moreover, T2 is one with respect to a period in which the printer 200 receives the ping command responses that are sent from the PCs. In particular, it is the waiting period in which each of the PCs is capable to wait for responses to the ping commands after the printer 200 transmitted the ping commands to the PCs.

Figures 5, 6:
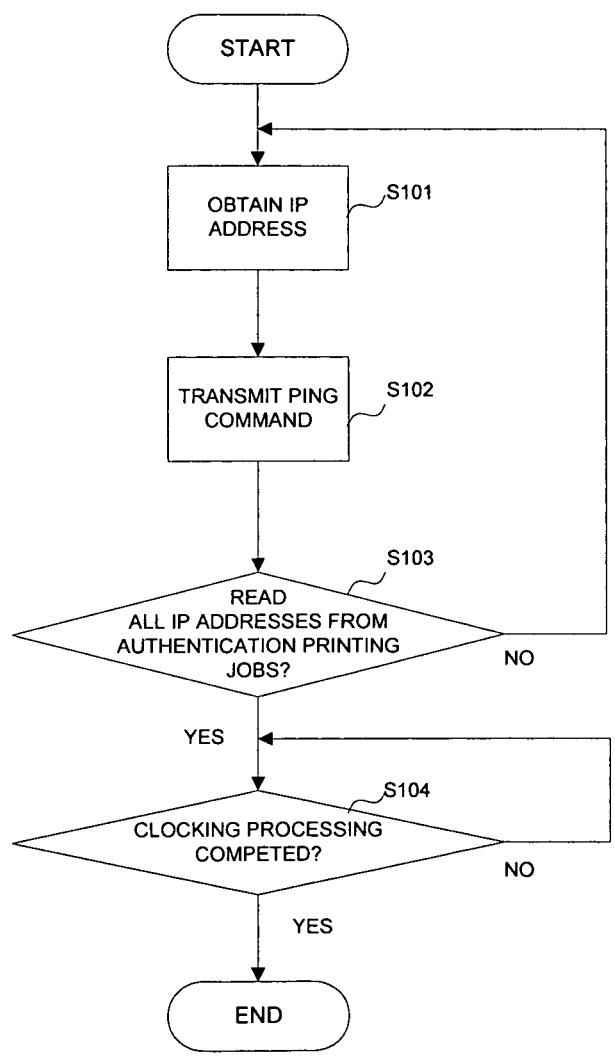
FIG. 5 is an exemplary message.
FIG. 6 is a flow diagram explaining processing executed by the attribute managing part of FIG. 2.

For example, once the printer 200 sends the ping commands to the PC 100-1, PC 100-3 and PC 100-4, each PC that received a ping command transmits a response of the ping command to the printer 200. Moreover, the printer 200 transmits the ping commands to the PCs 100-1, 100-3 and 100-4 again when the predetermined period of time T1 elapses. The PCs 100-1 and 100-4 send the responses of the ping commands to the printer 200. However, as the power is turned off at this point, the PC 100-3 does not transmit the response to the ping command to the printer 200. When the predetermined time T1 elapses, the printer 200 transmits the ping commands to the PCs 100-1, 100-3 and 100-4, and also informs the PC 100-3 that the printer 200 deleted the authentication printing job C1 transmitted by the PC 100-3 as shown in FIG. 5. Moreover, this notification is sent when the power is turned off once and turned on again at the PC 100-3, and the printer 200 transmits the first subsequent ping command.

Next, the aforementioned operation processing is explained. First of all, the processing executed by each part is explained. Then the data processing of the authentication printing job is explained.

First of all, the processing executed by the attribute managing part 220 is explained using the block schematic diagram of FIG. 2 and the flow diagram of FIG. 6. The flow diagram of FIG. 6 explains the processing that is executed by the attribute managing part 220, and especially the judging part 223. When the ping command is transmitted and the predetermined time T1 has elapsed, the user information detecting part 221 obtains the IP address of the PC 100 from the user information attached to all received authentication printing jobs. This IP address is obtained as the ping command destination that is transmitted from the printer 200 (S101).

Next, the packet transmitting part 222 transmits the ping command to the PC 100 that holds the IP address obtained by the user information detecting part 221 (S102). After the processing of the S102, the judging part 223 confirms whether or not the user information detecting part 221 reads all of the IP addresses from authentication printing jobs stored in the user information storing part 232 (S103). Moreover, the judgment of the judging part 223 is executed to specify the PC 100 for which the authentication printing jobs are stored in the printer 200, and to detect the PC in which power is turned off among all of the PCs.

At S103, when the judging part 223 judges that all of the IP addresses are extracted by the user information detecting part 221 (S103, YES), the judging part 223 instructs the clocking time calculating part 241 to clock the time. The clocking processing of the clocking time calculating part 241 will be described later. When the judging part 223 judges the processing by the clocking time calculating part 241 is completed (S104, YES), the processing is completed (END).

Figure 7:
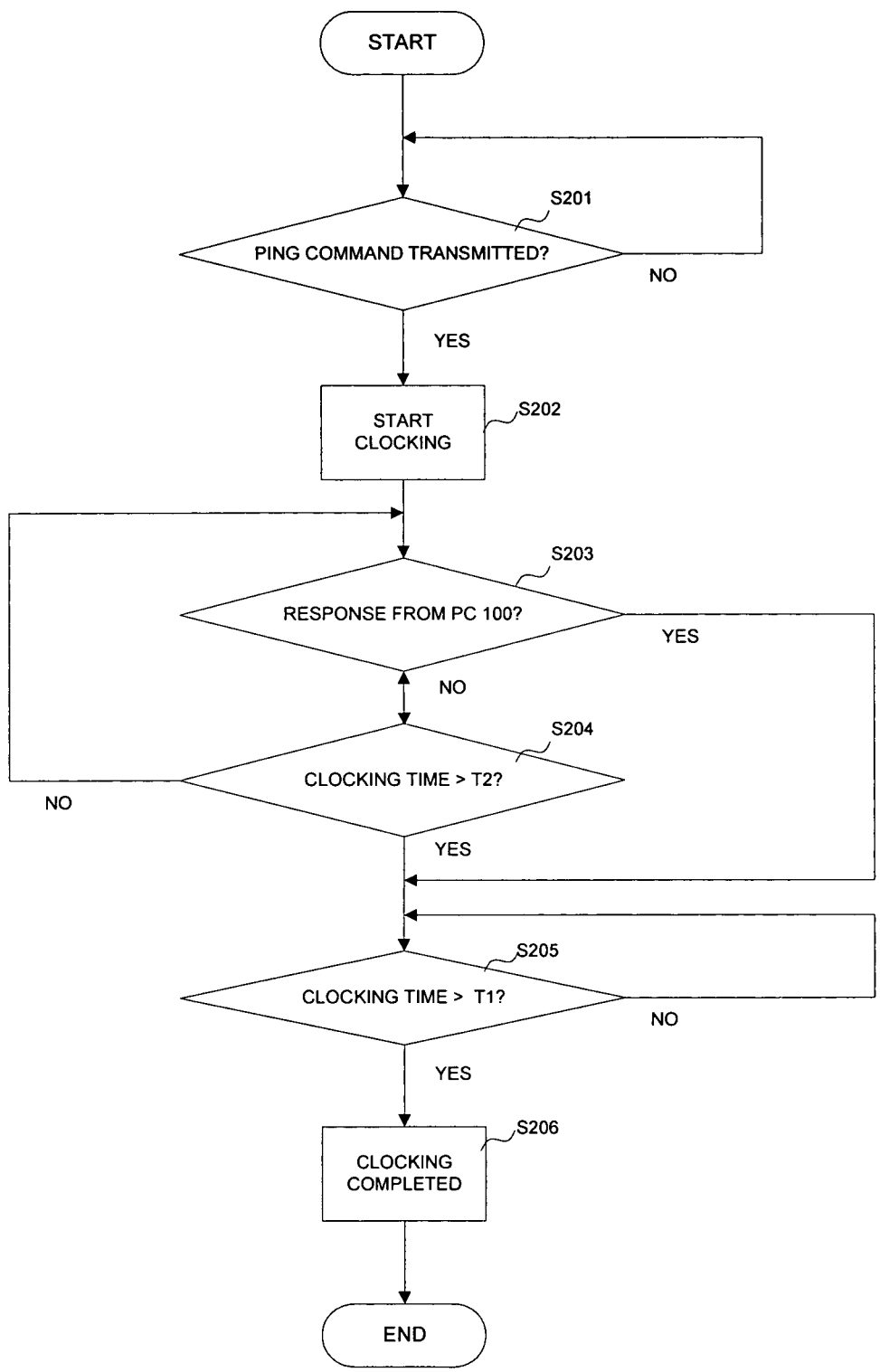
FIG. 7 is a flow diagram explaining a clocking time process.

Next, the processing regarding the clocking time is explained using FIG. 2 and the flow diagram of FIG. 7. First of all, at S201, the judging part 223 judges whether or not the packet transmitting part 222 transmits the ping command to a PC 100. Here, when the judging part 223 judges that the ping command is transmitted to the PC 100, the judging part 223 instructs the clocking time calculating part 241 to read the time output by the timer 260. The clocking time calculating part 241 that received the instructions to read the time starts clocking/calculating the clocking time (S202).

Next, the judging part 223 judges whether or not there is a response from the PC 100 that received the ping command (S203). Here, when there is the response with respect to the ping command from the PC 100, (S203, YES), the processing by the judging part 223 moves to S205. On the other hand, when there is no response from the PC 100 (S203, NO), the processing by the judging part 233 moves to S204. At S204, the judging part 223 judges whether or not the clocking time started by the clocking time calculating part 241 at S202 reached the predetermined time T2 that is the response period time of the printer 200. In detail, the judging part 223 judges using the difference between the time output by the timer 260 and the time that is output at the time of when clocking started at S202. Here, when the clocking time reaches the predetermined time T2, the processing by the judging part 223 moves to S205. On the other hand, when the clocking time has not reached the predetermined time T2, the processing by the judging part 223 will return to S203. At S205, the judging part 223 judges whether or not the clocking time started at S202 reached the predetermined time T1, which is the transmission interval time of the ping command. Here, when the clocking time has reached the predetermined time T1, the judging part 223 instructs the clocking time calculating part 241 to complete the calculation processing of the clocking time. On the other hand, when the clocking time has not reached the predetermined time T1, the judging part 223 waits until reaching to the predetermined time T1.

Figure 8:
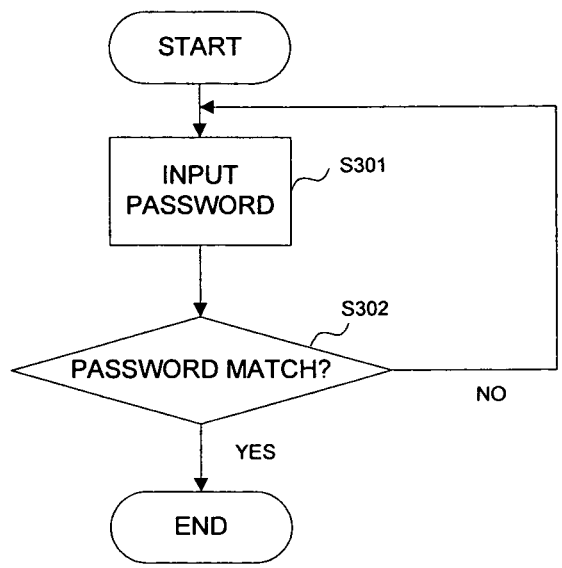
FIG. 8 is a flow diagram explaining processing of a password input by a user.

The processing of the password input by the user is explained using FIGS. 2 and 8. Specifically, the flow diagram of FIG. 8 explains the processing of the password input by the user though the inputting part 250. First of all, the password, or authentication information, is input though the inputting part 250 at S301. At S302, the judging part 223 then compares the password that was extracted as user information from the authentication printing data and the input password at S301 (S302). Here, when the password matches (S302, YES), the judging part 223 completes the processing. On the other hand, when the password does not match (S302, NO), the processing of S301 and S302 is repeated.

Figure 9:
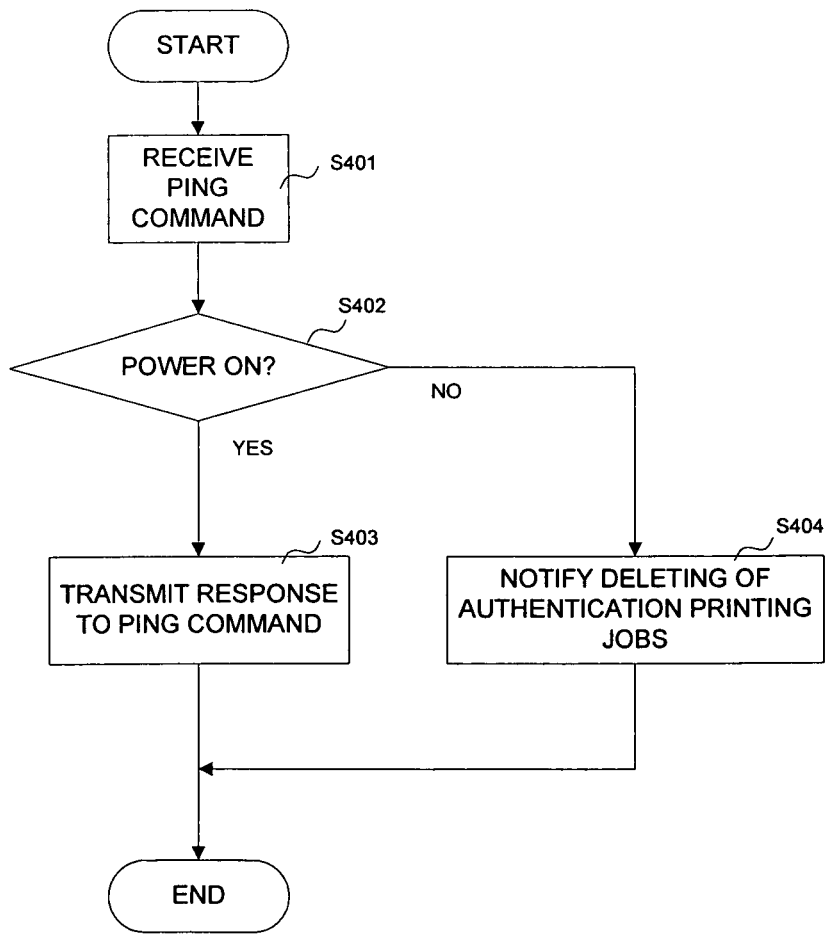
FIG. 9 is a flow diagram explaining packet processing.

Next, the packet processing is explained using FIGS. 2 and 9. The flow diagram of FIG. 9 explains the processing executed by the PC 100 after the PC 100 receives the ping command transmitted from the packet transmitting part 222. First of all, at S401, the input/output part 130 which received the ping command transmitted from the packet transmitting part 222 through the input/output I/F part 210 provides the received ping command to the controlling part 120. Here, when the power of the PC 100 is turned on (S402, YES), the controlling part 120 transmits the response to the ping command to the printer 200 (S403). On the other hand, when the power of the PC 100 is turned off and the response to the ping command is not returned from the controlling part 120, the delayed deleting part 242 instructs CPU 280 to delete the authentication printing data. The CPU 280, upon receiving the deleting instructions, executes the control program stored in the ROM 290 in advance, and deletes the authentication printing job from the print queue. Moreover, at the same time, the data deleting part 243 deletes the user information of the authentication printing jobs stored in the user information storing part 232. Further, the user information managing part 224 informs the PC 100 that the authentication printing jobs were deleted (S404).

Figure 10:
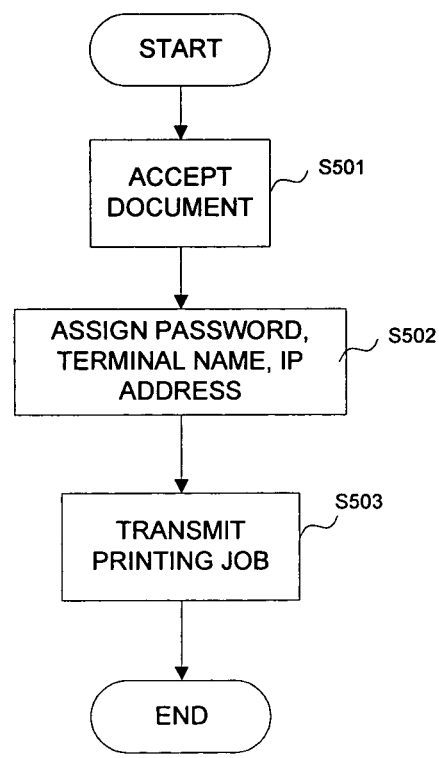
FIG. 10 is a flow diagram explaining processing executed by the PC of FIG. 1.

Next, the processing executed by the PC 100 is explained using FIGS. 2 and 10. FIG. 10 is the flow diagram that explains processing from creation of documents as the authentication printing data of the authentication printing job to the transmission of the authentication printing job at the PC 100. First, the document created by the user is accepted through the application software of the controlling part 120 (S501). The printer driver of the controlling part 120 converts the document into the printing data that is recorded in readable description language by the printer 200. Moreover, the printer driver assigns the user information such as a password, the terminal name of the PC 100 and the IP address for specifying the position on the network of PC 100 to the printing data which was converted, and creates the authentication printing job in which collating using the password is necessary to execute printing (S502). Next, the printer driver instructs the input/output part 130 to transmit the authentication printing job. The input/output part 130 that received the transmission instructions transmits the authentication printing job to the printer 200 through the input/output I/F part 210 (S503).

Figure 11:
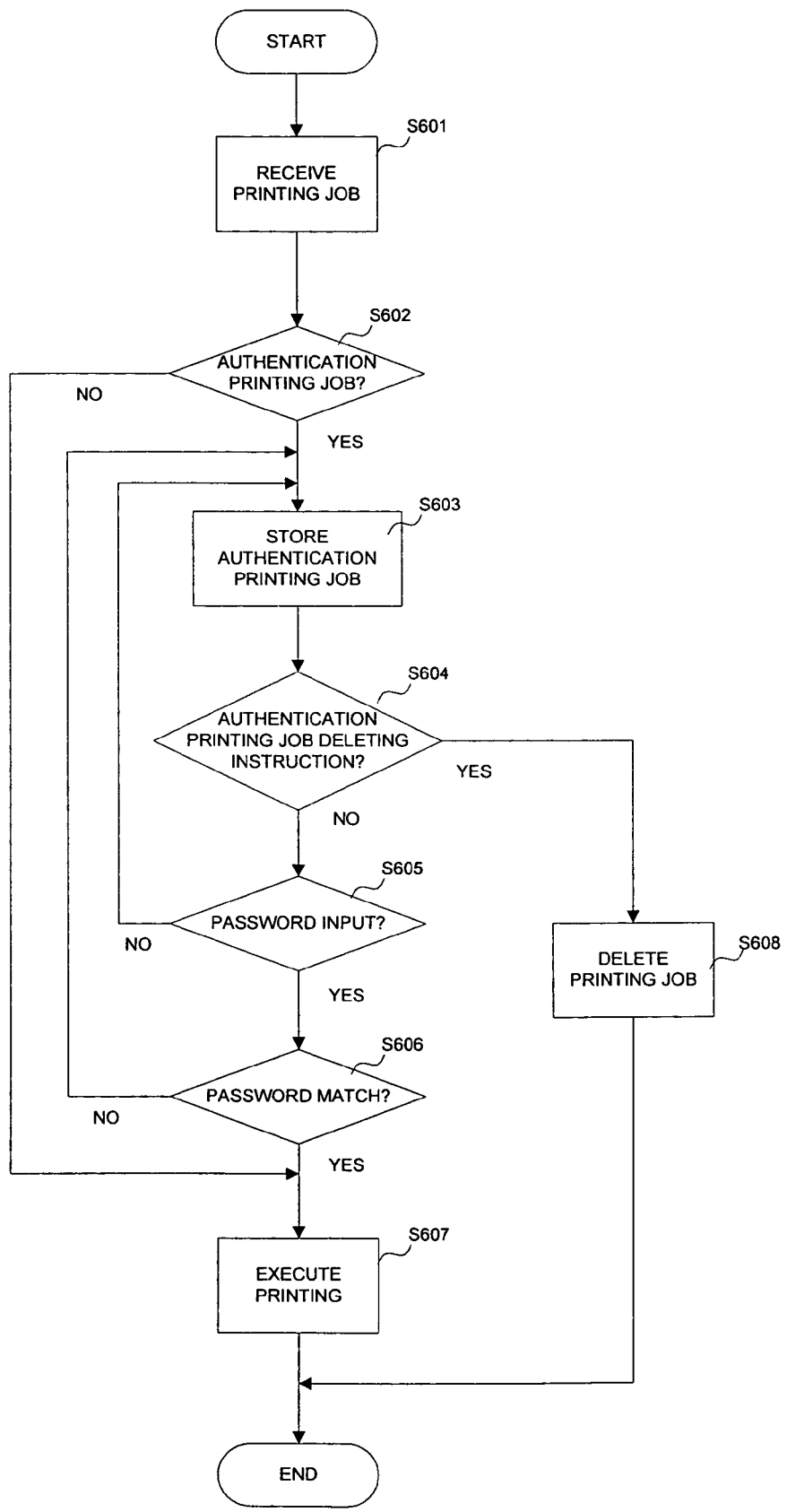
FIG. 11 is a flow diagram explaining data processing of an authentication printing job.

Next, the data processing of the authentication printing job is explained using FIGS. 2 and 11. First of all, at S601, the printer 200 receives the printing job transmitted by the PC 100 through input/output I/F part 210. Next, the user information detecting part 221 obtains the user information assigned to the received printing job. Here, when the password is included in the user information that the user information detecting part 221 obtained, the judging part 223 judges that the received printing job is the authentication printing job (S602, YES). On the other hand, when the password is not included in the user information that the user information detecting part 221 obtained, the judging part 223 normally judges that the printing job is a printing job (S602, NO), and instructs the printing part 270 to execute printing (S607).

At S603, the user information managing part 224 stores the user information of the authentication printing job in the user information storing part 232 and stores the authentication printing job in the authentication data storing part 231 based on the judgment of the judgment part 223 of S602. Next, the judging part 223 executes the execution processing explained in FIG. 6 and the clocking processing explained in FIG. 7, and judges whether or not deleting instructions were received in connection with the authentication printing job (S604). Here, when the judging part 223 judges that deleting instructions were not received, the judging part 223 judges whether or not the password was input through the inputting part 250 by the user (S605). Here, when the password was input by the user, the judging part 223 judges whether or not the password input by the user matches the password assigned by the authentication printing job (S606). When the password input by the user and the password assigned to the authentication printing job match (S606, YES), the judging part 223 instructs the printing part 270 to execute printing (S607). The printing part 270 that received printing instructions prints the printing data of the authentication printing job on the recording medium.

On the other hand, at S604, when the judging part 223 judges that deleting instructions were received for the authentication printing job (S604, YES), the authentication printing job stored in the authentication storing part 231 and the user information stored in the user information storing part 232 are deleted based on the deleting instructions sent by the CPU 280 and provided by the delayed deleting part 242 and the data deleting part 243.

As stated above, according to the first embodiment, whether or not the authentication printing job remains is judged based on the power on/off condition of the PC 100 connected to the printer 200 and the network. The user can therefore securely save the authentication printing job in the printer 200 without being concerned about extending the saving period of the authentication printing job as long as the power of the PC 100 is on.

[Second Embodiment]

According to the second embodiment, the transmission protocol of the user information of the PC and the obtaining of the user information of the printer differ. In detail, while the user information is extracted from the authentication printing job transmitted from the printer in the first embodiment, the printer obtains the user information regularly from the PC in the second embodiment. Moreover, in the first embodiment, judgment on whether or not to keep the authentication printing jobs depends on the response of the PC that receives the ping command after the printer sends the ping command to the PC. On the contrary, in the second embodiment, whether or not the authentication printing job transmitted from the PC should remain in the printer is determined based on whether or not the printer receives the predetermined user information in a predetermined period. Hereafter, the printing device and the printing system of the second embodiment that can utilize this type of function will be explained.

Figure 13:
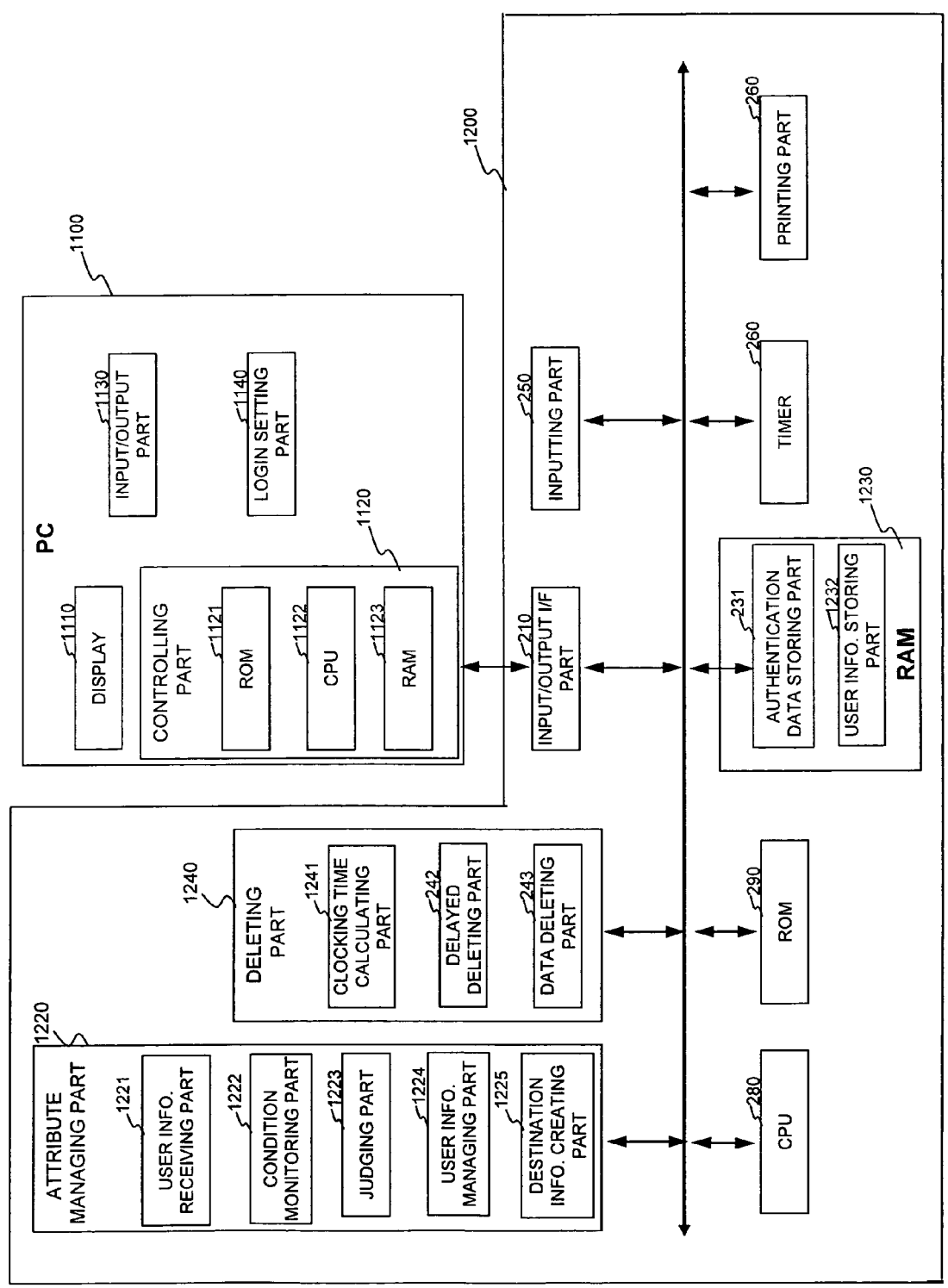
FIG. 13 is a schematic block diagram of the structure showing a PC and a printer according to another embodiment.

Referring to FIG. 13, a PC 1100 as a host device of the second embodiment includes a controlling part 1120 that automatically provides the user information to the printer 1200 as a printing device through the input/output I/F part 210, and is therefore different from the PC 100 of the first embodiment. Moreover, the printer 1200 that receives the user information that is automatically provided by the PC 1100 is different from the printer 200 of the first embodiment because the printer 1200 creates the authentication printing information to be stored in the user information storing part 1232 and another user list different from the authentication printing information. In the present embodiment, like numbers are assigned to parts that are same as in the first embodiment, and only the different parts are explained.

FIG. 13 is a functional block diagram showing a summarized structure of the PC 1100 and the printer 1200 of the second embodiment. First of all, the PC 1100 is explained, and the printer 1200 will be next explained.

The PC 1100 comprises a login setting part 1140 that accepts an input of a user login by the user in addition to the structure of PC 1100 of the first embodiment. Moreover, the PC 1100 includes a controlling part 1120 and an input/output part 1130 instead of the controlling part 120 and the input/output part 130 of the first embodiment, respectively. The controlling part 1120 includes an application program and a printer driver, and automatically provides the user information to the printer. The input/output part 1130 performs transmission of data such as user information and authentication printing data.

The controlling part 1120 includes a ROM 1121 that stores a control program, CPU 1122 that executes calculation processing and a RAM 1123 that forms a calculation area in the CPU 1122. The ROM 1121 is a nonvolatile memory medium storing a basic input/output system (BIOS) program and a resident program. The BIOS program is executed by the CPU 1122 at the time of activating the PC 1100 and controls the activation of the PC 1100. The resident program is continuously executed by the CPU 1122 while the PC 1100 is active, and controls the operating system and the input/output part 1130. The CPU 1122 executes the programs stored in the ROM 1121 or the RAM 1123, and is a microprocessor that controls the entire PC 1100. The RAM 1123 temporarily saves the documents created by the user using an application program and the printing data of the aforementioned documents, and also maintains the user information such as a user name of the login user received by the login setting part 1140.

The input/output part 1130 transmits the user information read from the RAM 1123 to the printer 1200 by executing the resident program stored in the ROM 1121.

The login setting part 1140 receives the login user name of the PC 1100. The login user name that was accepted by the login setting part 1140 is stored in the RAM 1123 together with the other user information.

Next, the printer 1200 will be explained. Unlike the structure of the printer 200 of the first embodiment, the printer 1200 includes an attribute managing part 1220 that controls the authentication printing job, a RAM 1230 and a deleting part 1240.

The attribute managing part 1220 includes a user information receiving part 1221, a condition monitoring part 1222, a judging part 1223, a user information managing part 1224 and destination information creating part 1225. Hereafter, the user information receiving part 1221, the condition monitoring part 1222, the judging part 1223, the user information managing part 1224 and the destination information creating part 1225 are explained.

The user information receiving part 1221 is same as the user information detecting part 221 of the first embodiment. In the second embodiment, the user information informed is arbitrarily provided from the PC 1100. The accepted user information is stored in the user information storing part 1232 by the control of the user information managing part 1224.

The condition monitoring part 1222 monitors whether or not the user who has transmitted the authentication printing job stored in the authentication data storing part 231 is still logged in to the PC 1100. A judgment whether or not the user is still logged in to the PC 1100 is performed by the judging part 1223 by comparing the user list with the user information stored in the user information storing part 1232 as later described.

The judging part 1223 judges the password collation (or password match) explained in the first embodiment. Moreover, the judging part 1223 executes the judging processing to the processing executed by each part, and the judging result is reported to the user information managing part 1224.

The user information managing part 1224 adds the login user name to the user information (except for the IP address) that is stored in the user information storing part 1232 and controls the user information. Moreover, the user information managing part 1224 manages the stored location of the authentication printing job in the authentication data storing part 231.

The destination information storing part 1225 creates a user list (described later) that is a unit of the login user name, transmission destination terminal and password.

The RAM 1230 includes the authentication data storing part 231 and the user information storing part 1232. The user information storing part 1232 is an area where the user information accepted by the user information receiving part 1221 is stored. The user information is stored as the user list and authentication printing information, which is later explained as similar as the first embodiment.

The deleting part 1240 comprises a clocking time calculating part 1241, a delayed deleting part 242, data deleting part 243. The clocking time calculating part 1241 performs calculation of an accepted cycle for the user information transmitted from the PC 1100.

Next, the operation of the printer 1200 and PC 1100 is explained. First of all, the transmission sequence of authentication printing jobs executed between the printer 1200 and the PC 1100 is explained using FIGS. 13 and 14. Then, a sequence of the transmission signal executed between the printer 1200 and the PC 1100 is explained using FIGS. 13 and 15. Moreover, in FIGS. 14 and 15, the printer 1200 is arranged on the left side of the drawing, and the PC 1100 is arranged on the right side. Top to bottom represents sequentially elapsed time.

Figure 14:
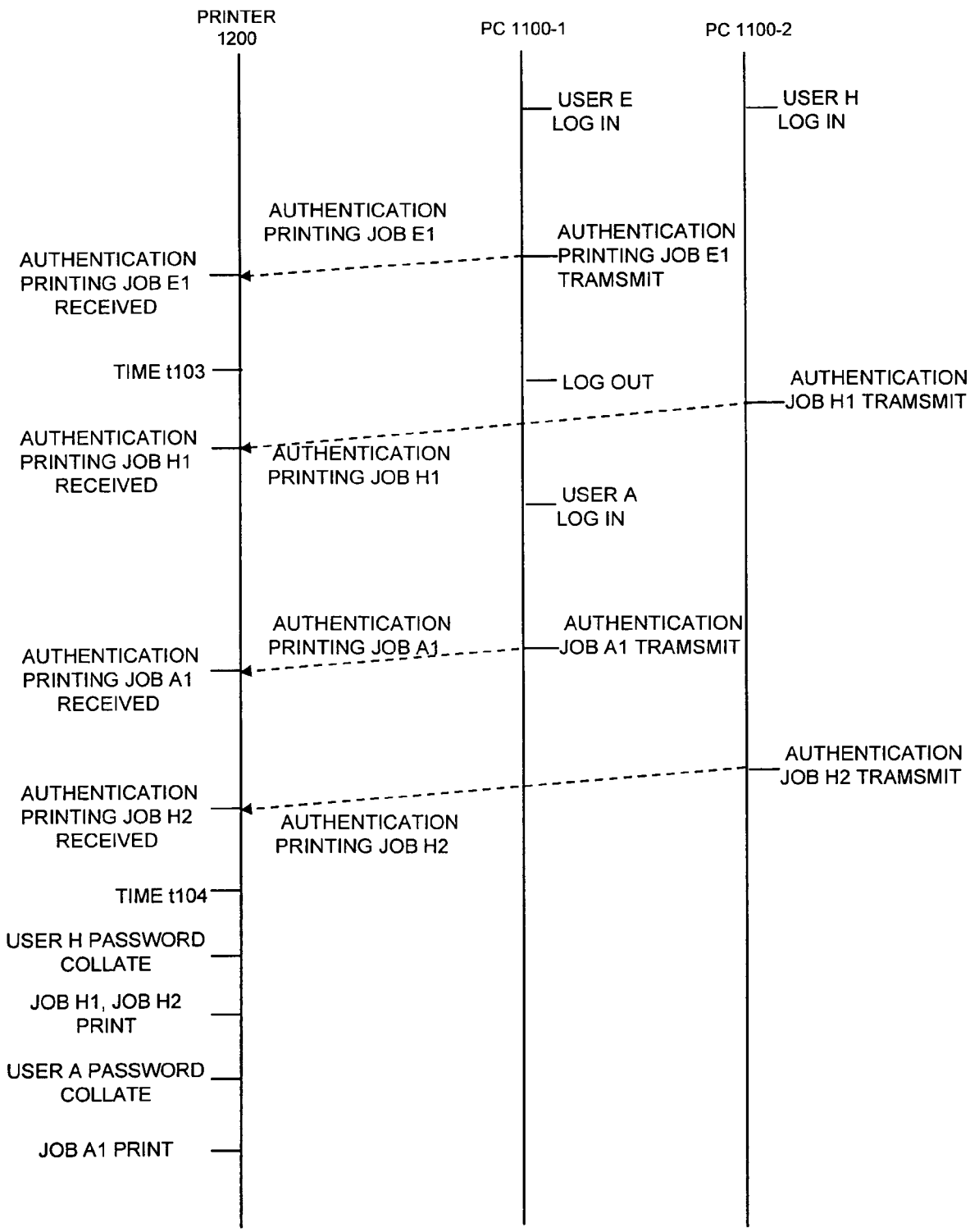
FIG. 14 is a sequence diagram explaining an authentication printing job sequence.
Figures 18, 19:
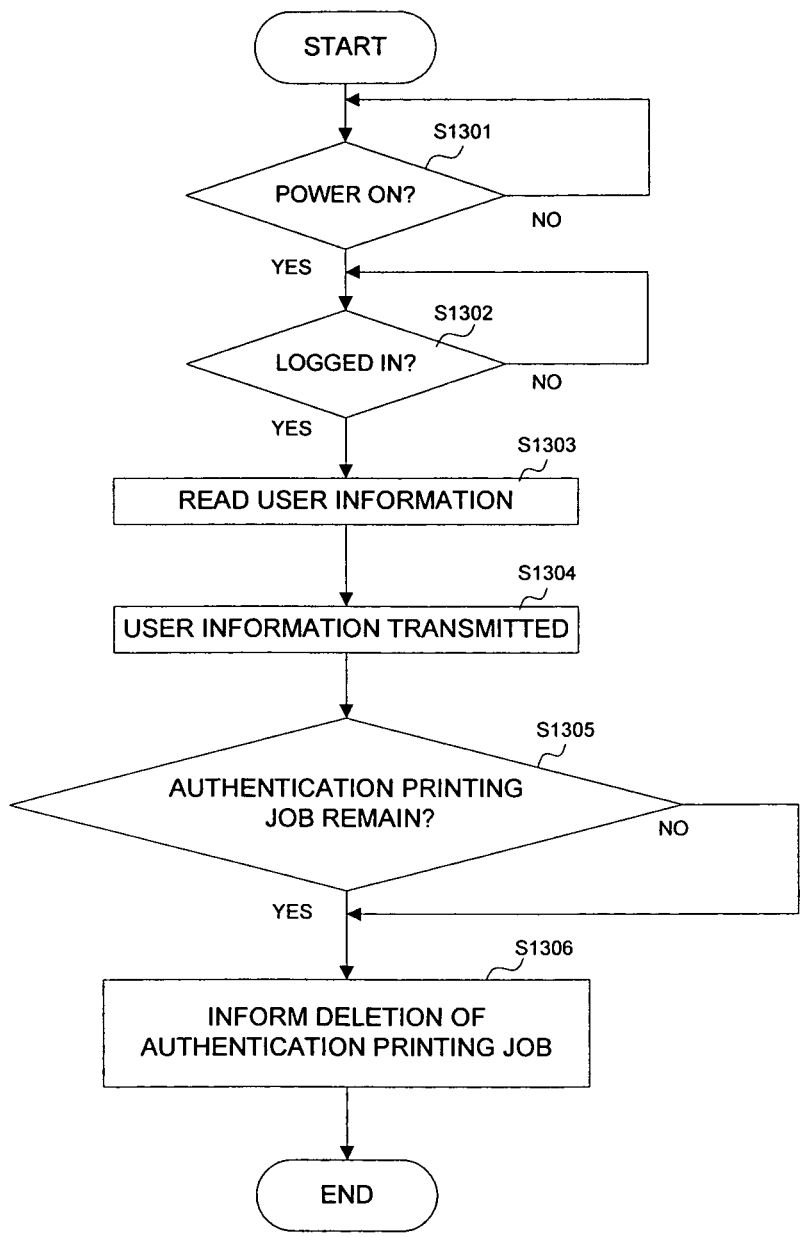
FIG. 18 is a flow diagram explaining user information notification processing and deleting notification processing of authentication printing data.
FIG. 19 is a table of exemplary authentication printing job managing information.

In FIG. 14, two PCs (PC 1100-1 and PC 1100-2) and the printer 1200 are connected through the network. First, a user E logs in to the PC 1100-1, then a user H logs in to the PC 1100-2. The authentication printing job E1 is transmitted from the PC 1100-1, and the user E logs out from the PC 1100-1. Next, the authentication printing job H1 is transmitted from the PC 1100-2. After this, the user A logs in the PC 1100-1, and the authentication job A1 is transmitted. At last, the authentication printing job H2 is transmitted from the PC 1100-2. Each authentication printing job transmitted from each PC is stored once in the RAM 1230 of the printer 1200. Here, t103 in FIG. 14 is defined as the time (or time period) from when the authentication printing job from the PC 1100-1 or PC 1100-2 is received until the login user of the PC 1100-1 logs out. Moreover, t104 of FIG. 14 is defined as the time (time period) from when the first login user logs out and another user logs in to the PC 1100-1 by another authentication printing job is received from the PC 1100-1. At these times, the authentication printing job is stored in the user information storing part 1232 as the authentication printing job managing information (APJM information) shown in FIGS. 19 and 20. The APJM information shown in FIGS. 19 and 20 is the screen of the APJM information at the aforementioned times t103 and t104, and shows the print queue of the authentication printing job. The APJM information is stored in the user information storing part 1232. FILE NAME, LOGIN USER NAME, TRANSMISSION SOURCE TERMINAL and PASSWORD are stored as the content to specify the authentication printing job in the APJM information in the user information storing part 1232. Moreover, the login user and transmission source terminal at times of t103 and t104 are stored as the user list in the user information storing part 1232 that is shown in FIGS. 21 and 22. The user list shown in FIGS. 21 and 22 is a user list that is stored in the user information storing part 1232. The user list is composed of LOGIN USER NAME that indicates the sender of the authentication printing job and TRANSMISSION SOURCE TERMINAL that indicates the name of the transmission source of authentication printing job of PC 1100, which are contents to specify the output source.

Figure 15:
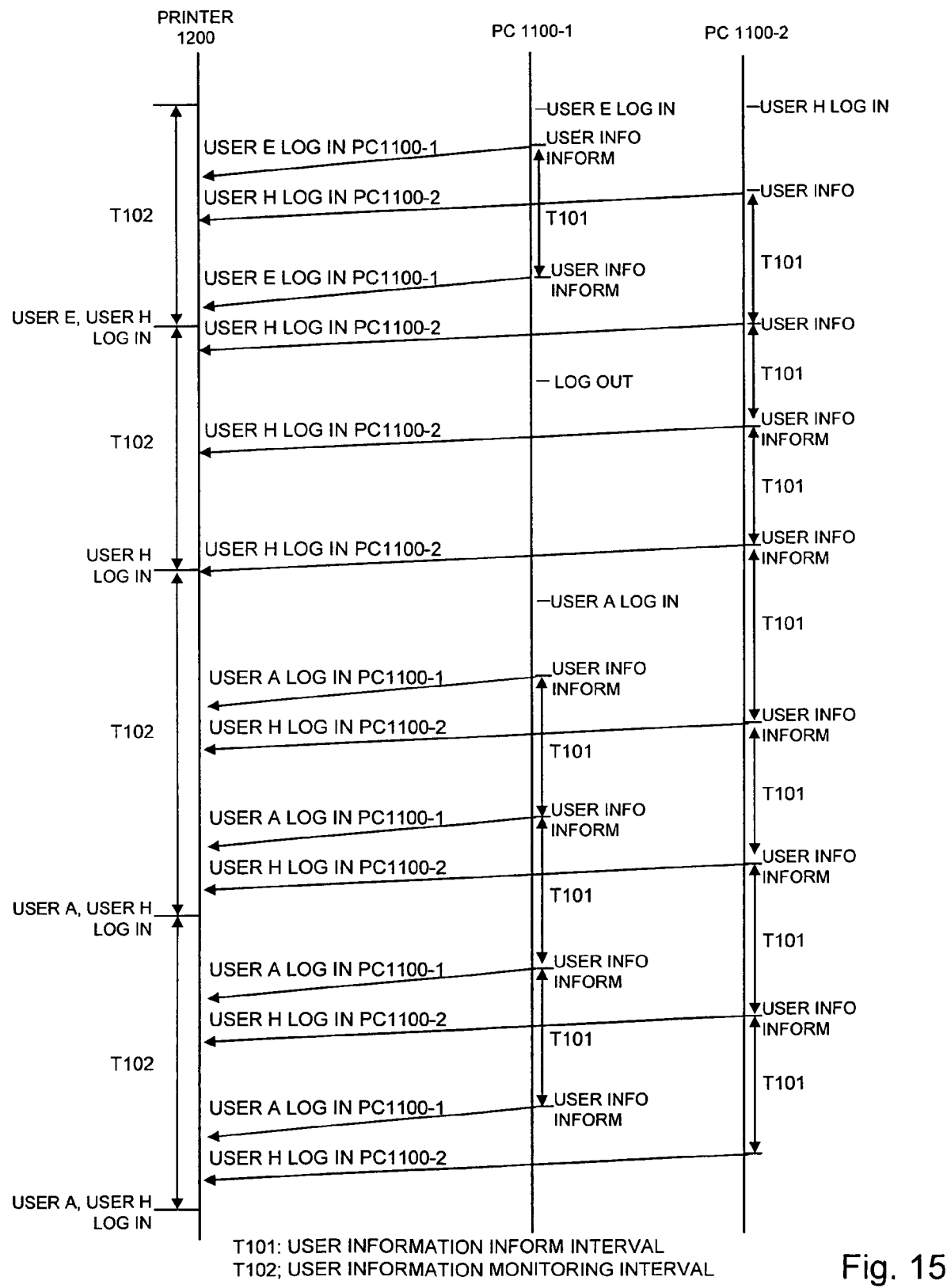
FIG. 15 is a sequence diagram explaining a user information notification sequence.

At this time, transmission of the transmission signal is performed between two PCs 1100-1, 1100-2 and the printer 1200 as shown in FIG. 15. Here, the times shown in FIG. 1 (T101 and T102) are the times to be calculated at the clocking time calculating part 1241, and T101 is the cycle that the predetermined PC 1100-1, 1100-2 provides the user information to the printer 1200. Specifically, T101 is the time period from when one of the PCs 1100-1, 1100-2 provides a first notification to the printer 1200 until/by the one of the PCs 1100-1, 1100-2 provides a second notification to the printer 1200. T102 is a cycle for monitoring the notifications of the user information with respect to all of the PCs 1100-1, 1100-2 connected to the network and the printer 1200. The user information accepted by the printer 1200 in each cycle is managed at the user list.

For example, when the user E logs in to the PC 1100-1, the PC 1100-1 provides the user information concerning the login user E to the printer 1200. Moreover, when the user H logs in to the PC 1100-2, the PC 1100-2 provides the user information concerning the login user H to the printer 1200. Notification of the user information to the printer 1200 by the PC 1100-1 is performed for every cycle of T101. When the user E logs out from the PC 1100-1, the notification of the user information from the PC 1100-1 is suspended, and when another user A logs in to the PC 1100-1, the PC 1100-1 provides the user information concerning the login user A for every T101 cycle. The printer 1200 monitors notification of the user information for every T102 cycle. The user information accepted by the printer 1200 for each cycle is managed at the user list.

Next, the aforementioned operation processing is explained hereafter. Only the flow diagrams different from the first embodiment are selected and used for the explanation of the operation of the present embodiment.

Figure 16:
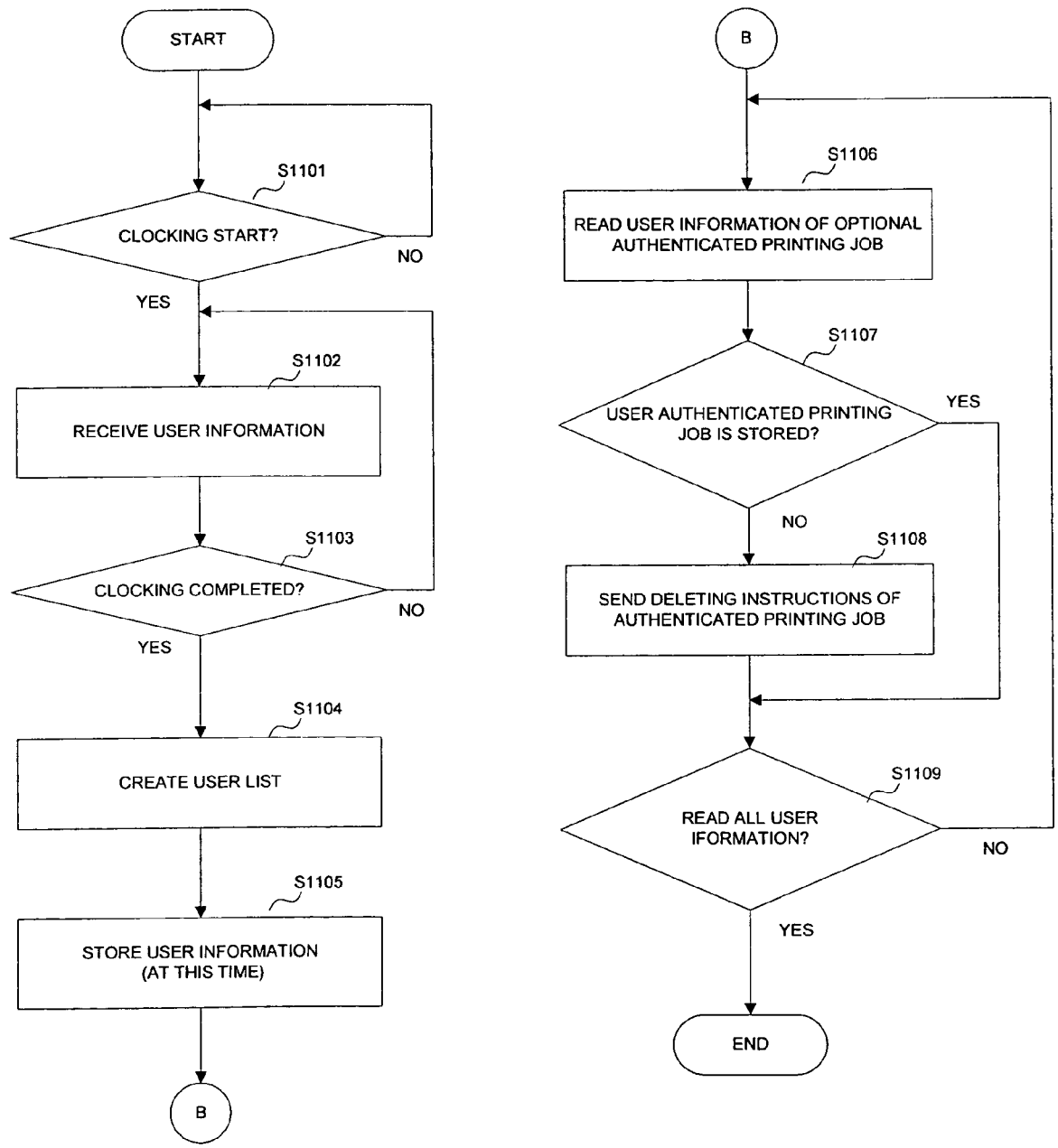
FIG. 16 is a flow diagram explaining processing executed by the attribute managing part of FIG. 13.

First of all, the processing executed by the attribute managing part 1220 is explained using FIGS. 13 and 16. The flow diagram of FIG. 16 explains the processing executed by the attribute managing part 1220, and particularly by the judging part 1223 and the user information managing part 1224. At S1101, the user managing part 1224 obtains notification that clocking by the clocking time calculating part 1241 has started. At S1101, when the clocking by the clocking time calculating part 1241 has started (S1101, YES), the condition monitoring part 1222 continues to accept the user information from the PC 1100. When the condition monitoring part 1222 receives the user information from the PC 1100 (S1102), then the user information managing part 1224 obtains the notification that the clocking of clocking time was completed from the clocking time calculating part 1241 (S1103). When the notification of completion of clocking is received from the clocking time calculating part 1241, the user information managing part 1224 instructs a destination information creating part 1225 to create a user list. The destination information creating part 1225 creates the user list for one cycle of the user information that was received at S1102, and stores the created user list in a user information storing part 1232 (S1104). Next, the judging part 1223 reads the user information of the optional user from the user list (S1106), and judges whether or not the user information is stored as a print queue of the authentication printing job in the user information storing part 1232 (S1107). Here, when the user information is stored, the processing at the judging part 1223 moves to S1109 (S1107, YES). When the used information is not stored, a deleting instructions of the authentication printing job including the user information is sent, and the information is deleted based on the deleting instructions sent to CPU 280 by the delayed deleting part 242 and the data deleting part 243 (S1108). Next, the judging part 1223 confirms whether or not all user information listed on the user list stored in the user information storing part 1232 is read (S1109). Here, when it is judged that all user information is read (S1109, YES,) the judging part completes the processing. When all user information is not read, (S1109, NO), the processing at S1106-1108 is repeated.

Figure 17:
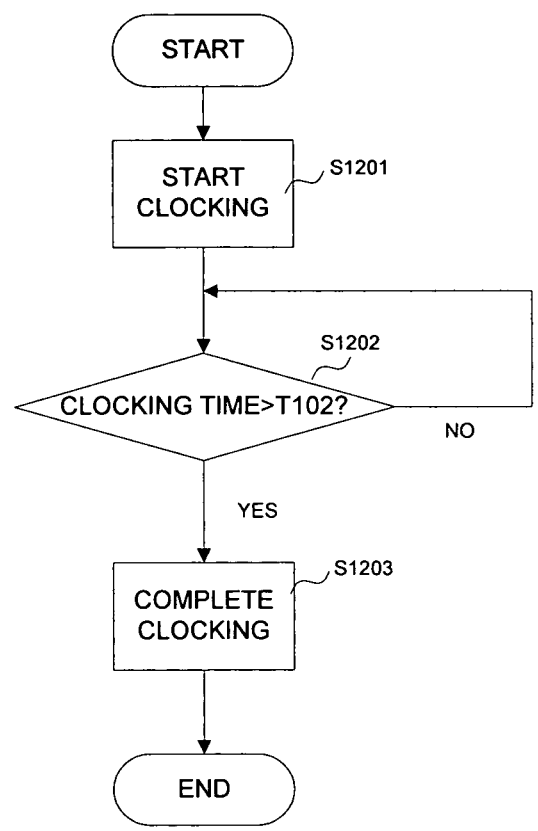
FIG. 17 is a flow diagram explaining a clocking time process.

Next, processing of the clocking time using FIG. 17 is explained. The clocking time calculating part 1241 starts clocking based on the output time by the timer 260 when clocking of the previous clocking time is completed. This calculation is performed for the period of monitoring interval of the user information defined at T102 (S1201). Next, the clocking time calculating part 1241 judges whether or not the clocking time started at S1201 reaches the predetermined time T102 (S1202). When the clocking time reaches the predetermined time T102 (S1202, YES), the processing of the clocking time calculating part 1241 is completed (S1203).

On the other hand, when the clocking time does not reached the predetermined time T102 at S1202, the processing of the clocking time calculating part 1241 returns to S1202.

Next, a user information notification processing to the printer 1200 and deleting notification processing of authentication printing data from the printer 1200 at the PC 1100 are explained using FIG. 18. The user information notification processing is an alternative processing with h respect to the response to the ping command described in the first embodiment. The user information is notified to the printer 1200 by the CPU 1122 executing the resident program stored in the ROM 1121. First of all, when the power of PC 1100 is turned on (S1301 YES), and the user is logged in the PC 1100 through the login setting part 1140 (S1302, YES), the CPU 1122 activates the resident program stored in ROM 1121 in order to provide the user information to the printer 1200. The activated stationed program reads the user information stored in RAM 1123 (S1303). Here, the user information indicates the login user name and the terminal name. Next, the user information read from RAM 1123 is informed to the printer 1200 through the input/output part 1130. This notification of the user information is informed to the printer 1200 by CPU 1122 to activate the resident program for every predetermined time T101 (S1304). At S1304, the judging part 1223 of the printer 1200 that received the notification of user information judges whether or not the user who newly logs in the PC 1100 is the user who left the authentication printing job in the printer 1200 when previously logged out (S1305, AUTHENTICATION PRINTING JOB REMAIN?). Here, if the user who newly logs in to the PC 1100 is the user who left the authentication printing job in the printer 1200 when previously logged out, the authentication printing job notifies the PC 1100 that the authentication printing job has been deleted (S1306). The PC 1100 that received the notification displays the same on the display screen 1110.

As stated above, according to the second embodiment, whether or not the authentication job remains is determined based on the user's login or logout from the PC 1100 that is connected through the printer 1200 and the network. Even when there are many users who share one PC 1100, the authentication printing jobs of the users who are logged in to the PC 1100 can be securely saved in the printer 1200 while maintaining security of each user's authentication printing job.

In the explanation of the present embodiment, a PC was used as the host device. However, this invention can be used for a system that uses a printer server, work station or the like. Moreover, although the printer is used as a printing device, an MFP, facsimile, a copying machine or the like can be used. Further, the network as a communication path that connects the image processing device and the image forming device is explained; however other communication paths such as RS 232C, IEEE 1284 or USB can be used.

What is claimed is:

1. A printing device for receiving authentication printing data transmitted by a host device through a communication network and printing an image based on the authentication printing data on a recording medium, comprising:

a receiving part configured to receive the authentication printing data and user information from the host device;
a memory part configured to store the authentication printing data an the user information;
a device specifying part configured to specify a position on the communication network of the host device by using the user information that was received at the receiving part;
a condition monitoring part configured to monitor a device condition of the host device, which is a transmission source of the authentication printing data, specified by the device specifying part;
an authentication information inputting part configured to accept an input of authentication information by the user;
a judging part configured to judge whether or not the authentication printing data and the user information need to be deleted based on a monitoring result of the condition monitoring part, and to judge whether or not to approve printing of the image based on the authentication printing data by collating the authentication information that was received by the authentication information inputting part and the user information attached to the authentication printing data;
a deleting part configured to delete, based on a judgment of the judging part, the authentication printing data and the user information stored in the memory part; and
a printing part configured to print the image on the recording medium based on the authentication printing data and based on the judgment of the judging part.

2. The printing device of claim 1 wherein, the user information comprises network address information of the host device, 3. The printing device of claim 1, wherein the condition monitoring part monitors power on/off conditions of the host device.

4. The printing device of claim 1, wherein the condition monitoring part monitors login and logoff conditions of the user, which corresponds to the user information stored in the memory part, of the host device.

5. The printing device of claim 4, wherein when the user logs out of the host device after the host device transmits the authentication printing data and the user information and when the user logs in the host device again, the judging part notifies the user that the authentication printing data and the user information have been deleted by the deleting part.

6. The printing device of claim 1, wherein the deleting part includes a delayed deleting part configured to delete the authentication printing data and the user information after the predetermined period of time has elapsed from when the condition monitoring part identifies a defect at the host device.

7. A printing system comprising;
an information processing device including,
    a document creating part configured to accept creation of a document by a user, and
    a controlling part configured to convert the document created at the document creating part into authentication printing data and to transmit the authentication printing data and user information over a communication network; and
a printing device including,
    a receiving part configured to receive the authentication printing data and user information from the information processing device,
    a memory part configured to store the authentication printing data and the user information,
    a device specifying part configured to specify a position on the communication network of the information processing device by using the user information that was received at the receiving part,
    a condition monitoring part configured to monitor a device condition of the information processing device, which transmits the user information to the printing device, specified by the device specifying part,
    an authentication information inputting part configured to accept an input of the authentication information by the user,
    a judging part configured to judge whether or not the authentication printing data and the user information need to be deleted based on a monitoring result of the condition monitoring part, and to judge whether or not to approve printing of the image based on the authentication printing data by collating the authentication information that was received by the authentication information inputting part and the user information attached to the authentication printing data,
    a deleting part configured to delete, based on a judgment of the judging part, the authentication printing data and the user information stored in the memory part, and
    a printing part configured to print the image on the recording medium based on the authentication printing data and based on the judgment of the judging part.

8. The printing system of claim 7, wherein the controlling part transmits the authentication printing data in which the user information of the information processing device is attached to the printing device as a printing job.

9. The printing system of claim 7, wherein the user information comprises network address information of the information processing device.

10. The printing system of claim 7, wherein the condition monitoring part monitors power on/off conditions of the information processing device.

11. The printing system of claim 7, wherein the condition monitoring part monitors login and logoff conditions of the user, which corresponds to the user information stored in a memory, of the information processing device.

12. The printing system of claim 7, wherein the deleting part includes a delayed deleting part configured to delete the authentication printing information and the user information after the predetermined period of time has elapsed. from when the condition monitoring part identifies a defect at the information processing device.

13. A printing device, comprising:
a processor;
an attribute managing part configured to be activated by the processor to communicate with a host device, to determine a state of the host device, and to control authentication printing data received from the host device, which is a transmission source of the authentication printing data;
a memory configured to store the authentication printing data and user information extracted from the authentication printing data; and a deleting part configured to delete, based on the state of the host device determined by the attribute managing part, the authentication printing data and the user information stored in the memory.

14. The printing device of claim 13, wherein the attribute managing part is further configured to transmit a ping command to the host device and to determine whether the host device sends a response to the ping command, and the deleting part is configured to delete the authentication printing data and the user information stored in the memory if the host device fails to send the response to the ping command.

15. The printing device of claim 13, wherein the deleting part is further configured to delete the authentication printing data and the user information based on user login and logout information transmitted periodically from the host device, the user corresponding to the user information stored in the memory.

16. A method of controlling, in a printing device, authentication printing data received from a host device, which is a transmission source of the authentication printing data, comprising:

receiving and storing, in the printing device, the authentication printing data and user information contained in the authentication printing data;

determining, in the printing device, a status of the host device subsequent to receiving the authentication printing data and the user information; and deleting, in the printing device, the authentication printing data and the user information received from the host device based on a result of the determining of a status of the host device.

17. The method of claim 16, wherein the deleting of the authentication printing data and the user information is based on non-responsiveness of the host device to a ping command.

18. The method of claim 16, wherein the deleting of the authentication printing data and the user information is based on a login/logout status of a user, which corresponds to the user information stored in the printing device, at the host device.

19. The method of claim 16, wherein an inquiry of the state of the host device is delivered from the printing device to the host.

20. The method of claim 16, wherein the state of the host device indicates an operational condition.

* * * * *